March 18, 1930. L. D. SOUBIER 1,750,972
METHOD OF AND APPARATUS FOR FORMING GLASS TUBING
Filed Feb. 16, 1927
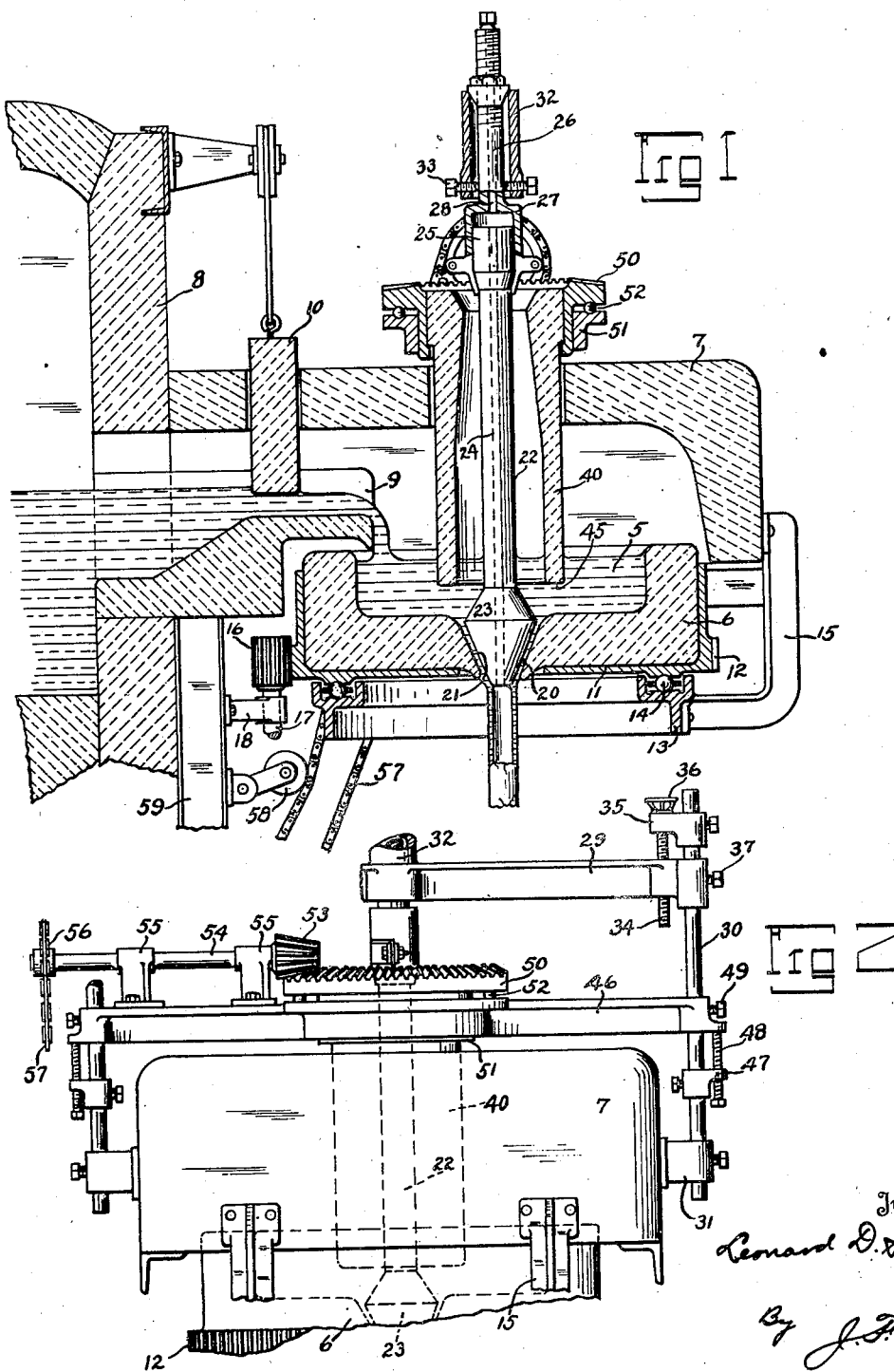

Patented Mar. 18, 1930

1,750,972

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

METHOD OF AND APPARATUS FOR FORMING GLASS TUBING

Application filed February 16, 1927. Serial No. 168,724.

The present invention relates to an improved method and apparatus for forming glass tubing by a continuous drawing process. According to the present disclosure, the invention comprises a continuously rotating molten glass container having a bottom outlet into which projects a stationary mandrel whose surface forms with the outlet walls, an annular passageway through which the glass issues. A stationary device projects into the glass near the annular passageway and due to the continuous rotation of the container maintains uniform distribution of glass at the outlet and also prevents one sided cooling of the glass.

Patent No. 1,571,216, granted to me February 21, 1926, discloses a tube drawing apparatus embodying this same general principle of operation, but employs a rotating mandrel to maintain proper circulation of the glass and uniform temperature distribution.

An object of the present invention is to provide an improved construction in which the glass container itself is rotated about a stationary mandrel, said mandrel and the walls of a bottom outlet in the container forming a shaping die for the tubing being produced.

Another object is to provide an apparatus for forming glass tubing in which the tubing is drawn in its final shape and size directly from a mandrel projecting into a continuously rotating mass of glass. This construction overcomes the necessity for providing separate apparatus for shaping and sizing the tubing after it has been drawn from the supply body, thereby contributing materially to quantity production at a minimum cost.

Other objects of the invention will be apparent hereinafter.

In the accompanying drawings:

Fig. 1 is a sectional elevation of an apparatus constructed in accordance with my invention, and Fig. 2 is a fragmentary front elevation of the same.

The glass is continuously drawn in tube or cane form by suitable mechanism (not shown) as it issues from a continuously rotating supply body 5 of molten glass within a rotating pot or container 6, said pot 6 being located beneath a protecting hood or housing 7 and constantly receiving a supply of fresh glass from the furnace 8 by way of a trough 9. The flow of glass through the trough 9 is regulated by a gate or cut-off 10. The pot or tank 6 is formed of suitable refractory and is supported in a metal shell or casing 11 carrying an annular or ring gear 12 and supported on a circular track 13. Anti-friction balls 14 are interposed between the track 13 and the casing 11 for obvious reasons. This track 13 may be supported directly from the hood 17 by arms 15 or any other approved manner. A pinion 16 runs in mesh with a ring gear 12 and is carried by a shaft 17, journalled in a bearing 18. This shaft 17 may be rotated by any preferred mechanism. The pot 6 is formed with an axial bottom outlet opening 20 whose walls 21 are tapered or downwardly convergent.

Projecting vertically downward through the molten glass in the pot 6 is a mandrel comprising a stem 22 having at its lower end a conical or frusto-conical head 23 whose surface is substantially parallel with the tapered walls 21, said parallel walls forming an annular downwardly convergent passageway through which the glass issues. The head 23 (Fig. 1) projects a considerable distance below the outlet and provides a downwardly tapered shaping surface over which the glass flows after leaving the bottom outlet, and from the lower edge of which surface the glass is drawn in its final tubular or cane form. Because of the provision of a definite point at which the molten glass is drawn from the mandrel 23, the necessity for employing additional apparatus to properly shape and size the cane or tube is entirely eliminated. The stem 22 and mandrel 23 are provided with a continuous axial opening 24 by which air is supplied to the interior of the tubing being drawn from said mandrel.

The upper end of the mandrel carrying stem 22 is formed with a head 25 by which it is attached to a screw threaded rod 26 forming a vertical extension of the mandrel. The lower end of the rod 26 is formed with a socket 27 to receive the head 25 and form an airtight connection so that the only air entering the tubing being drawn will be that injected by way of a passageway 28 through said rod 26. The mandrel is supported in a yoke 29 mounted on vertical standards 30 whose lower ends are vertically adjustably supported in brackets 31 fixed to said hood or cover 7. A bearing sleeve 32 provides connection between the mandrel carrying rod 26 and the yoke 29. Mandrel centering screws 33 are carried by the sleeve 32.

Variations in the thickness of the tubing being drawn is controlled by vertical adjustment of the yoke and mandrel, such adjustment being possible without interrupting machine operation. For this purpose, adjusting rods 34 are provided. These rods are supported in bearing brackets 35 and have screw threaded connection with the yoke 29. By rotation of hand wheels 36 carried by the rods 34, the yoke and mandrel may be adjusted up or down and then secured in such adjusted position by set screws 37 (Fig. 2). Air may be supplied to the mandrel through said rod 26 in any approved manner.

Continuous rotation of the glass container 6 is intended to agitate the glass and provide uniform distribution of temperature around the outlet opening. By providing a combined flow regulating tube and stirring means 40, the molten glass is additionally agitated to insure absolutely uniform distribution of temperature around the outlet. Adjustment of the tube or sleeve 40 up and down in the glass varies the area of the annular passageway 45 formed by the lower end wall and the bottom of the tank 6. It is evident that rotation of the tank with respect to the regulating tube 40, sets up a certain degree of centrifugal action in and adjacent the annular passageway 45 so that flow of glass to the outlet is retarded in direct proportion to the extent to which the passageway is increased or decreased in area and to the speed of rotation. This tube 40 is supported by a vertically adjustable yoke 46 which is mounted on the standards 30 heretofore referred to, said standards carrying brackets 47 in which adjusting screws 48 are mounted. These adjusting screws may be rotated to move the yoke and regulating tube 40 upwardly, and upon reaching the desired position, the yoke may be locked against further movement by set screws 49.

Under certain conditions, as for example in the event the pot rotating means becomes inoperative, rotation of the tube 40 may be desirable to agitate the molten glass. A bevel ring gear 50 is fixed to the upper end of said tube and supported on a circular track 51 carried by said yoke 46. Anti-friction balls 52 are interposed between the gear 50 and the circular track 51. A bevel pinion 53 runs in mesh with the ring gear 50 and is carried by a shaft 54 journalled in bearings 55 rising from the yoke 46. The outer end of the shaft 54 carries a sprocket wheel 56 over which a sprocket chain 57 is trained. This sprocket chain 57 may be driven in any preferred manner. A slack take-up roller 58 is pivotally mounted upon the frame 59 so that when the tube is in its lowermost position, the driving chain 57 will be sufficiently taut to permit proper driving of said tube. Upon raising the tube 40, the slack-up device automatically lifts so that it does not interfere with the tube adjustment.

The rotative speed of the pot and tube may be varied by any approved mechanism (not shown). Also, the pot and tube may be rotated in opposite directions or in the same direction. By rotating both the pot and tube, and providing a variable speed control for each one, the speed of the pot may be reduced in the event the tubing being formed shows that the walls of the annular outlet are moving at too high speed. The speed of the tube 40 may then be stepped up to compensate for the loss of glass agitating efficiency by reduction of the pot speed.

In operation, the glass is continually supplied to the tank 6 from the furnace 8. The flow regulating tube 40 is adjusted toward the bottom wall surrounding the bottom outlet in the tank 6 to control the flow of molten glass to the annular passageway between the mandrel 23 and the wall of said bottom outlet. Rotation of the pot stirs the glass around the outlet, causing an even distribution of temperature and preventing one sided cooling of the glass as it enters the annular outlet passageway 21. The glass flowing over the downwardly convergent mandrel 23 is gradually given its tubular shape and when it reaches the lower edge of the mandrel, the glass has been given the final size and shape of the tubing being produced. Thus, a single mandrel or forming head serves to give the tubing or cane its final shape and size.

Manifestly, certain minor changes may be resorted to within the spirit and scope of the appended claims.

What I claim is:

1. The method of forming glass tubing which consists in causing molten glass to flow vertically from a solid mass of molten glass in a container, constantly supplying fresh glass to the container, continuously rotating the entire mass of glass in the container about an axis coincident with that of the vertically flowing tubing, continuously applying a movement retarding force to portions of the glass in proximity of the axis of rotation, and giving the tubing its final shape substantially at its point of departure from the mass of glass.

2. In a tube forming apparatus, the combination of a container for molten glass having an outlet opening extending through the floor thereof, a mandrel projecting downward in said opening and providing with the walls of said opening an annular passageway through which the glass flows and from which it issues and is drawn in tubular form, a supporting item rising from the mandrel, a tubular member surrounding said stem, said member projecting downward into the glass and having its lower end terminating above the floor of the container, and means to rotate the container and tubular member.

3. In a tube forming apparatus, the combination of a container for molten glass having an outlet opening extending through the floor thereof, a stationary mandrel projecting downward in said opening and providing with the walls of said opening an annular passageway through which the glass flows and from which it issues and is drawn in tubular form, a supporting stem rising from the mandrel, a tubular member surrounding said stem, said member projecting downward into the glass and having its lower end terminating above the floor of the container, and means whereby the container and said member may be rotated in opposite directions.

4. In a tube forming apparatus, the combination of a container for molten glass having an outlet opening extending through the floor thereof, means for supplying molten glass to said container and maintaining a head of glass therein, a stationary mandrel comprising a stem projecting downward into the glass in the container and a head carried by said stem and projecting into said outlet opening, means for supplying air through said head, a tube surrounding said stem and projecting downward into the glass with its lower end terminating at a level above the floor of the container, and means for continuously rotating said tube and container.

5. In a tube forming apparatus, the combination of a container for molten glass having an outlet opening extending through the floor thereof, means for supplying molten glass to said container and maintaining a head of glass therein, a mandrel comprising a stem projecting downward into the glass in the container and a head carried by said stem and projecting into said outlet opening, means for supplying air through said head, a tube surrounding said stem and projecting downward into the glass with its lower end terminating at a level above the floor of the container, and means for continuously rotating said tube and container.

6. In a tube forming apparatus, the combination of a container for molten glass having an outlet opening extending through the floor thereof, means for supplying molten glass to said container and maintaining a head of glass therein, a stationary mandrel comprising a stem projecting downward into the glass in the container and a head carried by said stem and projecting into said outlet opening, a tube surrounding said stem and projecting downward into the glass with its lower end terminating at a level above the floor of the container, means for continuously rotating the container, said head extending downward through said outlet opening and forming therewith an annular passageway through which the glass flows and by which the issuing glass is given a tubular form, and means for supplying air through said head to the interior of the tube.

Signed at Toledo, in the county of Lucas and State of Ohio, this 14th day of February, 1927.

LEONARD D. SOUBIER.